UNITED STATES PATENT OFFICE.

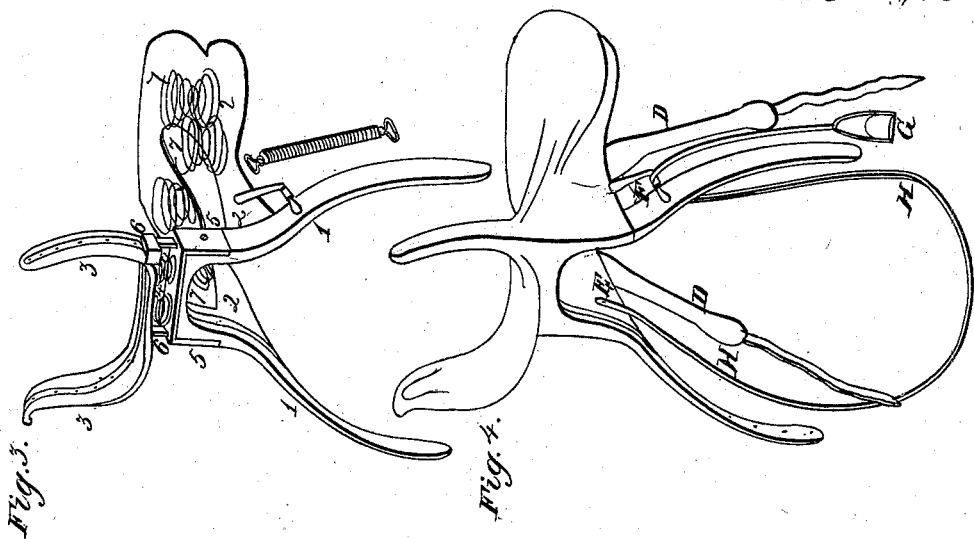
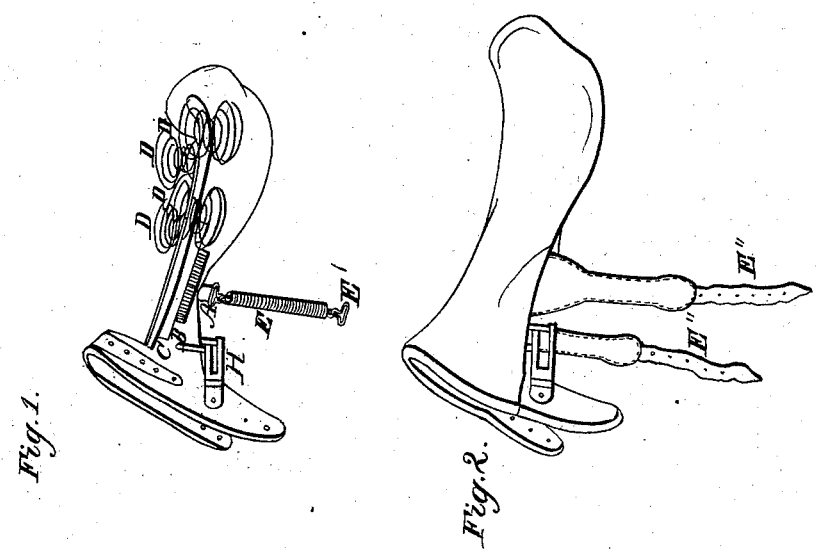

ROBERT SPENCER, OF NEW YORK, N. Y.

SPRING-SADDLE.

Specification of Letters Patent No. 3,353, dated November 24, 1843.

*To all whom it may concern:*

Be it known that I, ROBERT SPENCER, of the city of New York, in the State of New York, have invented a new and useful Improvement in the Manner of Constructing Elastic Spring-Saddles; and I do hereby declare that the following is a full and exact description thereof.

My first improvement consists in the dividing of the saddletree into two parts, and the manner of connecting these parts together so as to give to the tree itself a degree of elasticity by which the horse is greatly relieved in his motions, and the rider is made to experience a corresponding degree of ease.

Figure 1, shows the tree and some of its appendages, without the covering. The division in the tree is made at or near the point A, so as to separate the fore and hind parts of it from each other, on both sides. C, is a strip of spring steel which is secured to the two parts, near its ends in such manner as to allow of their free motion to the required extent. B, is a spiral spring which is let into the wood of the tree, and is fastened at its two ends, near to the under side of the tree; it is in a state of tension, so as to draw the two parts of the tree together downward, wihout impeding the action of the spring C; instead of the spiral spring B, I intend sometimes to employ a second strip of steel, similar to C, which is to be confined to the tree near to the separation A, while its two ends are made to bear upon the two sections of the tree. Between the leather seat and the tree I place spiral springs D, D, such as are used in sofas, and other articles where elastic seats are required. I also construct my girths so as to give them a great degree of elasticity, with all the requisite firmness; this I effect as follows:

E, is a spiral spring, which is to be incased with leather, and which is to be attached to the tree in the usual manner; it has a loop E' at its lower end to which a strap is to be affixed.

H is the stirrup iron, or bar, and as this is made fast to the fore part of the tree, the effect of this will be that when the rider bears upon the stirrup the pressure being taken from the seat the springs D, D, rise up in proportion to said pressure.

Fig. 2, shows the saddle with the first covering on it, and made ready for the outside cover, the springs D, D, being only confined down, the spring E, covered with leather, and the straps E'', attached to them. The spring girths thus formed will be found to be more easy and secure than any have been heretofore used with saddles, adjusting themselves to the bulk and motions of the animal in the most satisfactory manner.

Fig. 3 represents a lady's or side saddle, which like the one just described may be divided into two parts, and held together in the manner of the gentleman's saddle; but as I attach the horns to the body of the saddle in a manner which allows to them a free elastic action; the dividing of the tree may be, in this case, dispensed with. Nos. 1, 1, is the fore part of the tree; No. 2 the body, or seat, Nos. 3, 3, the heads or horns. Nos. 4, 4, are spiral, or other springs which are placed between the lower side of the horns and the pommel of the saddle, said pommel being made flat, as shown in the drawing, to adapt it to the sustaining of the springs 4, 4; Nos. 5, 5, are grooved boxes, attached to the sides of the pommel, and Nos. 6, 6, are sliding bolts made fast to the horns and fitted into the grooves in said boxes, so as to slide freely up and down in them. It will be seen that by this arrangement an elastic action will be given to the horns which will essentially relieve the rider, and will be, in some respects, similar to that produced by the divided tree. Nos. 7, 7, are spiral springs, arranged on the seat, as in Fig. 1, but not yet confined down by any covering. Fig. 4, represents a saddle of the same kind, but with the first covering placed thereon, by which the springs 7, 7, are held in place, and the aperture hidden which contains the springs 4, 4. D, D, are the elastic spring girths, which are formed in the manner already described.

E is the offside bar, to which the stirrup leather or strap, H H is to be nailed. When in use this leather, or strap, is to be brought under the body of the horse, and passed through the stirrup bar F. The effect produced by thus arranging the leather, or strap H, will be that, when the rider presses upon the stirrup or slipper, G, the action of the strap will be such as will tend to keep the saddle upright on the back of the animal, and will afford a sense of security to a timid rider.

Having thus fully described the nature of my improvement, in elastic spring saddles, what I claim therein as new, and desire to secure by Letters Patent, is—

1. The giving of elasticity to the horns of a lady's saddle, by making them separate from the body of the tree, and sustaining thereon by means of spiral or other springs, and sliding bolts, whether said springs and bolts be arranged precisely in the manner above described, or in any other which is substantially the same in its action, and in the end attained.

2. I claim, also the manner of arranging the stirrup leather, or strap, in the lady's saddle, by bringing it under the body of the horse and passing it through the stirrup bar, for the purpose above fully set forth.

ROBERT SPENCER.

Witnesses:
THOS. P. JONES,
EDWIN L. BRUNDAGE.